(12) United States Patent
Hu et al.

(10) Patent No.: US 9,692,321 B2
(45) Date of Patent: Jun. 27, 2017

(54) FIVE LEVEL INVERTER

(71) Applicant: Sungrow Power Supply Co., Ltd., Hefei, Anhui (CN)

(72) Inventors: Bing Hu, Anhui (CN); Liying Xue, Anhui (CN); Yanhu Zhang, Anhui (CN); Lingbing Zhou, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/771,131

(22) PCT Filed: Dec. 4, 2013

(86) PCT No.: PCT/CN2013/088535
§ 371 (c)(1),
(2) Date: Aug. 27, 2015

(87) PCT Pub. No.: WO2015/081517
PCT Pub. Date: Jun. 11, 2015

(65) Prior Publication Data
US 2016/0268925 A1 Sep. 15, 2016

(51) Int. Cl.
*H02M 7/537* (2006.01)
*H02M 7/487* (2007.01)
(Continued)

(52) U.S. Cl.
CPC ............. *H02M 7/537* (2013.01); *H02M 1/32* (2013.01); *H02M 7/487* (2013.01);
(Continued)

(58) Field of Classification Search
CPC ........ H02M 1/32; H02M 7/487; H02M 7/537; Y02E 10/56
See application file for complete search history.

(56) References Cited

U.S. PATENT DOCUMENTS

2009/0316458 A1* 12/2009 Gonzalez Senosiain ............... H02J 3/383
363/132
2011/0216568 A1 9/2011 Koyama et al.
(Continued)

FOREIGN PATENT DOCUMENTS

CN 201789430 4/2011
CN 201789430 U 4/2011
(Continued)

OTHER PUBLICATIONS

International Search Report for PCT/CN2013/088536 dated Sep. 5, 2014 (12 pages).
(Continued)

*Primary Examiner* — Adolf Berhane
*Assistant Examiner* — Bart Iliya
(74) *Attorney, Agent, or Firm* — Conley Rose, P.C.

(57) ABSTRACT

A five level inverter comprises six switch tubes, two inductors, four capacitor units and two reverse current preventing devices. The common terminal of the third capacitor unit and the fourth capacitor unit is connected with the common terminal of the first capacitor unit and the second capacitor unit. The third capacitor unit and the fourth capacitor unit are used as the output filter circuit of the inverter, and the common terminal of the third capacitor unit and the fourth capacitor unit is used as the midpoint of the DC bus.

14 Claims, 9 Drawing Sheets

(51) Int. Cl.
*H02M 1/32* (2007.01)
*H02M 7/5387* (2007.01)
*H02M 1/00* (2006.01)
*H02M 1/12* (2006.01)

(52) U.S. Cl.
CPC .... *H02M 7/5387* (2013.01); *H02M 2001/007* (2013.01); *H02M 2001/123* (2013.01); *Y02E 10/56* (2013.01)

(56) References Cited

U.S. PATENT DOCUMENTS

| | | | |
|---|---|---|---|
| 2013/0016543 A1* | 1/2013 | Ku | H02M 7/53871 363/71 |
| 2013/0070504 A1 | 3/2013 | Xu et al. | |
| 2013/0200715 A1 | 8/2013 | Pettersson et al. | |
| 2014/0078802 A1* | 3/2014 | Ozkan | H02J 3/383 363/132 |
| 2014/0268962 A1* | 9/2014 | Lee | H02M 7/48 363/123 |

FOREIGN PATENT DOCUMENTS

| | | |
|---|---|---|
| CN | 201918915 U | 8/2011 |
| CN | 102204078 A | 9/2011 |
| CN | 202121518 U | 1/2012 |
| CN | 102403884 A | 4/2012 |
| CN | 102843056 A | 12/2012 |
| CN | 102882398 A | 1/2013 |
| CN | 103001526 A | 3/2013 |
| CN | 103248209 A | 8/2013 |
| CN | 103312203 A | 9/2013 |
| CN | 193247298 | 8/2014 |
| EP | 2226926 A1 | 9/2010 |
| EP | 2270971 A1 | 1/2011 |
| JP | H1127957 A | 1/1999 |
| JP | 2002-027764 A | 1/2002 |
| JP | 2002-078350 A | 3/2002 |
| JP | 2002-218656 A | 8/2002 |
| JP | 2010-119188 A | 5/2010 |
| JP | 2010-288381 A | 12/2010 |
| JP | 2011-078290 A | 4/2011 |
| JP | 2011-147252 A | 7/2011 |
| JP | 2012-125055 A | 6/2012 |

OTHER PUBLICATIONS

English Translantion of International Search Report for PCT/CN2013/088536 dated Sep. 5, 2014 (2 pages).

International Search Report for International Application No. PCT/CN2013/088535 dated Sep. 5, 2014.

IP Australia Patent Examination Report No. 1 dated Feb. 27, 2016, for Australian Application No. 2013407118.

Japanese Patent Application No. 2016-505681 Notification of Reasons for Refusal dated Oct. 6, 2016 (6 pages).

Chinese Patent Application No. 201380071177.4 Office Action dated Oct. 9, 2016 (16 pages).

EP Patent Application No. 13898642.7 extended European search report dated Nov. 23, 2016 (8 pages).

* cited by examiner

FIVE LEVEL INVERTER

This application is a national phase of International Application No. PCT/CN2013/088535, entitled "FIVE LEVEL INVERTER", filed on Dec. 4, 2013, which is incorporated by reference in its entirety herein.

FIELD

The disclosure relates to the technical field of power electronics, and in particular to a five-level inverter.

BACKGROUND

An inverter, which is adapted to convert a direct-current voltage outputted from a direct-current power supply into an alternative-current voltage and output the alternative-current voltage to a load circuit, is widely used in the field of photovoltaic power generation and wind power generation. However, a parasitic capacitance between the direct-current power supply (for example, a solar panel) and ground may produce a leakage current during operation of the inverter, which can be problematic because the leakage current would impair the quality of the outputted electric power, reduce the efficiency of the inverter, and harm the human body, thereby reducing reliability of the inverter.

Currently, inverters with various topologies such as H5, H6 and HERIC have been developed to address the problem of current leakage. However, these inverters are three-level inverter with lower efficiency. In contrast, a five-level inverter has a higher efficiency. Currently, there is an increasing interest in reducing the leakage current in the five-level inverter. For example, an existing five-level inverter is shown in FIG. 1. During operation of the five-level inverter, a power-frequency jump in a potential of a positive pole of the direct-current power supply DC, relative to a negative pole of the output, i.e. point C, may occur. The power-frequency jumping voltage, when applied across a parasitic capacitor between the positive pole (or the negative pole) of the direct-current power supply DC and ground, may produce a leakage current spike.

SUMMARY

In order to solve technical issues, a five-level inverter is provided according to the disclosure to reduce the leakage current and enhance efficiency and reliability of the inverter.

Technical solutions are provided according to the following disclosure.

A five-level inverter is provided according to the disclosure, which includes: a first switch, a second switch, a third switch, a fourth switch, a fifth switch, a sixth switch, a first capacitor unit, a second capacitor unit, a third capacitor unit, a fourth capacitor unit, a first inductor, a second inductor, a first reverse flow preventive element and a second reverse flow preventive element; where a positive pole of a direct-current power supply is connected to a first terminal of the first switch and a first terminal of the first capacitor unit; a negative pole of the direct-current power supply is connected to a first terminal of the second switch and a second terminal of the second capacitor unit;

a second terminal of the first switch is connected to a first terminal of the first reverse flow preventive element, a first terminal of the third switch and a first terminal of the fifth switch;

a second terminal of the first reverse flow preventive element is connected to a second terminal of the first capacitor unit, a first terminal of the second capacitor unit and a first terminal of the second reverse flow preventive element;

a second terminal of the second reverse flow preventive element is connected to a second terminal of the second switch, a first terminal of the fourth switch and a first terminal of the sixth switch;

a second terminal of the third switch is connected to a first terminal of the first inductor and a second terminal of the fourth switch; a second terminal of the fifth switch is connected to a first terminal of the second inductor and a second terminal of the sixth switch;

a second terminal of the first inductor is connected to a first terminal of the third capacitor unit; a second terminal of the second inductor is connected to a second terminal of the fourth capacitor unit;

a second terminal of the third capacitor unit and a first terminal of the fourth capacitor unit are connected to the second terminal of the first capacitor unit;

the first reverse flow preventive element is configured to prevent a current from flowing from the first terminal of the first reverse flow preventive element to the second terminal of the first reverse flow preventive element in a case that the first switch is turned on;

the second reverse flow preventive element is configured to prevent a current from flowing from the first terminal of the second reverse flow preventive element to the second terminal of the second reverse flow preventive element in a case that the second switch is turned on; and the second terminal of the first inductor and the second terminal of the second inductor are alternate-current output terminals of the inverter.

In an embodiment, a current flows from the first terminal of the first switch to the second terminal of the first switch in a case that the first switch is turned on; a current flows from the first terminal of the third switch to the second terminal of the third switch in a case that the third switch is turned on; and a current flows from the first terminal of the fifth switch to the second terminal of the fifth switch in a case that the fifth switch is turned on; and a current flows from the second terminal of the second switch to the first terminal of the second switch in a case that the second switch is turned on; a current flows from the second terminal of the fourth switch to the first terminal of the fourth switch in a case that the fourth switch is turned on; and a current flows from the second terminal of the sixth switch to the first terminal of the sixth switch in a case that the sixth switch is turned on.

In an embodiment, the inverter is configured to operate in six active operation modes which includes a first operation mode, a second operation mode, a third operation mode, a fourth operation mode, a fifth operation mode and a sixth operation mode; where the first switch, the second switch, the third switch and the sixth switch are turned on, and the fourth switch and the fifth switch are turned off, in a case that the inverter is in the first operation mode;

the inverter is configured to operate in a first operation sub-mode or a second operation sub-mode in a case that the inverter is in the second operation mode; the first switch, the third switch and the sixth switch are turned on, the second switch, the fourth switch and the fifth switch are turned off, the second terminal of the first capacitor unit is in a charging state, in a case that the inverter is in the first operation sub-mode; and the second switch, the third switch and the sixth switch are turned on, the first switch, the fourth switch and the fifth switch are turned off, and the second terminal of the first capacitor unit is in a discharging state, in a case that the inverter is in the second operation sub-mode;

the third switch and the sixth switch are turned on, and the first switch, the second switch, the fourth switch and the fifth switch are turned off, in a case that the inverter is in the third operation mode;

the first switch, the second switch, the fourth switch and the fifth switch are turned on, and the third switch and the sixth switch are turned off, in a case that the inverter is in the fourth operation mode;

the inverter is configured to operate in a third operation sub-mode or a fourth operation sub-mode in a case that the inverter is in the fifth operation mode; the first switch, the fourth switch and the fifth switch are turned on, the second switch, the third switch and the sixth switch are turned off, and the second terminal of the first capacitor unit is in the charging state, in a case that the inverter is in the third operation sub-mode; and the second switch, the fourth switch and the fifth switch are turned on, the first switch, the third switch and the sixth switch are turned off, and the second terminal of the first capacitor unit is in the discharging state, in a case that the inverter is in the fourth operation sub-mode; and the fourth switch and the fifth switch are turned on, and the first switch, the second switch, the third switch and the sixth switch are turned off, in a case that the inverter is in the sixth operation mode.

In an embodiment, a period of a periodic signal outputted by the inverter includes a first time interval, a second time interval, a third time interval, a fourth time interval, a fifth time interval and a sixth time interval; where the inverter is configured to operate in the second operation mode and the third operation mode alternately during each of the first time interval and the third time interval;

the inverter is configured to operate in the first operation mode and the second operation mode alternately during the second time interval;

the inverter is configured to operate in the fifth operation mode and the sixth operation mode alternately during each of the fourth time interval and the sixth time interval; and the inverter is configured to operate in the fourth operation mode and the fifth operation mode alternately during the fifth time interval.

In an embodiment, the second terminal of the first capacitor unit is in a same charge-discharge state during the first time interval, the second time interval and the third time interval; and is in a same charge-discharge state during the fourth time interval, the fifth time interval and the sixth time interval, where the same charge-discharge state of the second terminal of the first capacitor unit during fourth time interval, the fifth time interval and the sixth time interval is opposite to the same charge-discharge state of the second terminal of the first capacitor unit during the first time interval, the second time interval and the third time interval; or the second terminal of the first capacitor unit is in a same charge-discharge state during the first time interval, a latter half of the second time interval, the fourth time interval and a latter half of the fifth time interval; and is in a same charge-discharge state during a first half of the second time interval, the third time interval, a first half of the fifth time interval and the sixth time interval, where the same charge-discharge state of the second terminal of the first capacitor unit during the first half of the second time interval, the third time interval, the first half of the fifth time interval and the sixth time interval is opposite to the same charge-discharge state of the second terminal of the first capacitor unit during the first time interval, the latter half of the second time interval, the fourth time interval and the latter half of the fifth time interval; or the second terminal of the first capacitor unit is in a same charge-discharge state during the first time interval, a latter half of the second time interval, a first half of the fifth time interval and the sixth time interval; and is in a same charge-discharge state during a first half of the second time interval, the third time interval, the fourth time interval and a latter half of the fifth time interval, where the same charge-discharge state of the second terminal of the first capacitor unit during the first half of the second time interval, the third time interval, the fourth time interval and the latter half of the fifth time interval is opposite to the same charge-discharge state of the second terminal of the first capacitor unit during the first time interval, the latter half of the second time interval, the first half of the fifth time interval and the sixth time interval.

In an embodiment, the inverter is configured to operate in three passive operation modes which includes a seventh operation mode, a eighth operation mode and a ninth operation mode; where the first switch, the second switch, the third switch and the sixth switch are turned on, and the fourth switch and the fifth switch are turned off, in a case that the inverter is in the seventh operation mode;

the third switch, the fourth switch, the fifth switch and the sixth switch are turned on, and the first switch and the second switch are turned off, in a case that the inverter is in the eighth operation mode; and the first switch, the second switch, the fourth switch and the fifth switch are turned on, and the third switch and the sixth switch are turned off, in a case that the inverter is in the ninth operation mode.

In an embodiment, the first reverse flow preventive element is a first diode, and the second reverse flow preventive element is a second diode; where the first terminal of the first reverse flow preventive element is a cathode of the first diode, and the second terminal of the first reverse flow preventive element is an anode of the first diode; and the first terminal of the second reverse flow preventive element is a cathode of the second diode, and the second terminal of the second reverse flow preventive element is an anode of the second diode.

In an embodiment, the first reverse flow preventive element is the seventh switch, and the second reverse flow preventive element is the eighth switch; where the seventh switch is turned off in a case that the first switch is turned on; and the eighth switch is turned off in a case that the second switch is turned on.

In an embodiment, the second terminal of the first inductor is further connected to a positive pole of an alternate-current grid via the third inductor, and the second terminal of the second inductor is further connected to a negative pole of the alternate-current grid via the fourth inductor.

In an embodiment, the direct-current power supply is a photovoltaic power supply.

It can be seen from the above technical solution that, in the five level inverter according to the disclosure, the third capacitor unit and the fourth capacitor unit function as an output filtering circuit of the inverter, the second terminal of the first capacitor is a midpoint of a direct-current bus, and a common terminal of the third capacitor unit and the fourth capacitor unit is connected to a second terminal of the first capacitor unit, thereby a potential of the midpoint of the direct-current bus (or the positive pole or the negative pole of the direct-current power supply) relative to a midpoint of the output filtering circuit may be relatively stable, and the voltage jump may not occur. Thus the problem of the current leakage may be addressed, and efficiency and reliability of the inverter may be enhanced.

DETAILED DESCRIPTION OF THE DISCLOSED EXEMPLARY EMBODIMENTS

Figure 1:
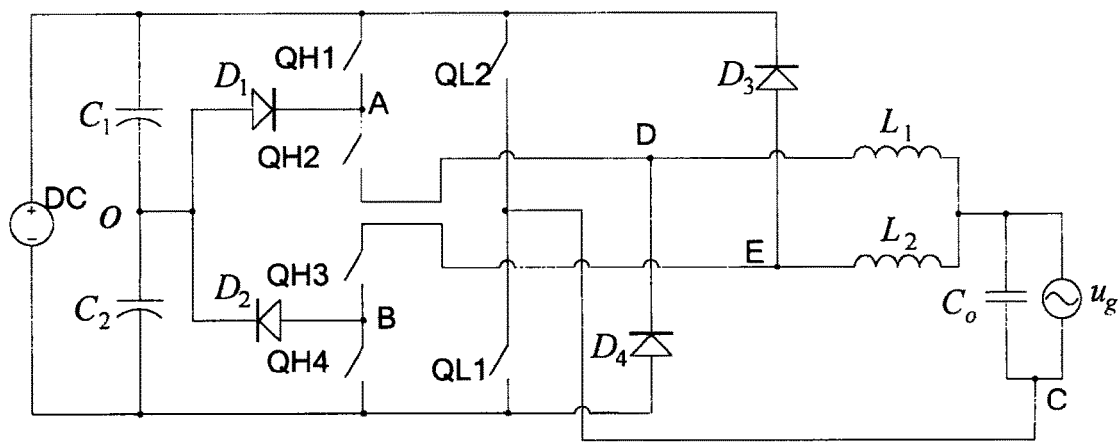
FIG. 1 is a circuit diagram of an existing five-level inverter.

During operation of the inverter, a power-frequency or high-frequency voltage jump in a potential of a direct-current power supply, with respect to an output negative pole (at the same potential as ground) may occur. The voltage jump may produce a leakage current when applied across the parasitic capacitor between the direct-current power supply (for example, the solar panel) and ground. The leakage current can be problematic because the leakage current would impair the quality of the outputted electric power, reduce the efficiency of the inverter, and harm the human body, thereby reducing reliability of the inverter. For example, an existing five-level inverter is shown in FIG. 1. During operation of the five-level inverter, a power-frequency jump in a potential of the direct-current power supply DC relative to an output negative pole, i.e. point C, may occur. That is, the power-frequency jump occurs in a potential of a midpoint of the bus which is a common terminal of the capacitor C1 and a capacitor C2 or in a potential of a negative pole of the direct-current power supply DC relative to an output negative pole. The output negative pole is typically in connection with a N wire of the grid which has almost the same potential as the ground. The power-frequency jumping voltage, when applied across a parasitic capacitor between the positive pole (or the negative pole) of the direct-current power supply DC and ground, may produce a leakage current spike.

A five-level inverter is provided according to the disclosure to address the problem of current leakage and enhance efficiency and reliability of the inverter.

Particular exemplary embodiments of the disclosure will now be explained in detail in conjunction with the drawings.

Figure 2:
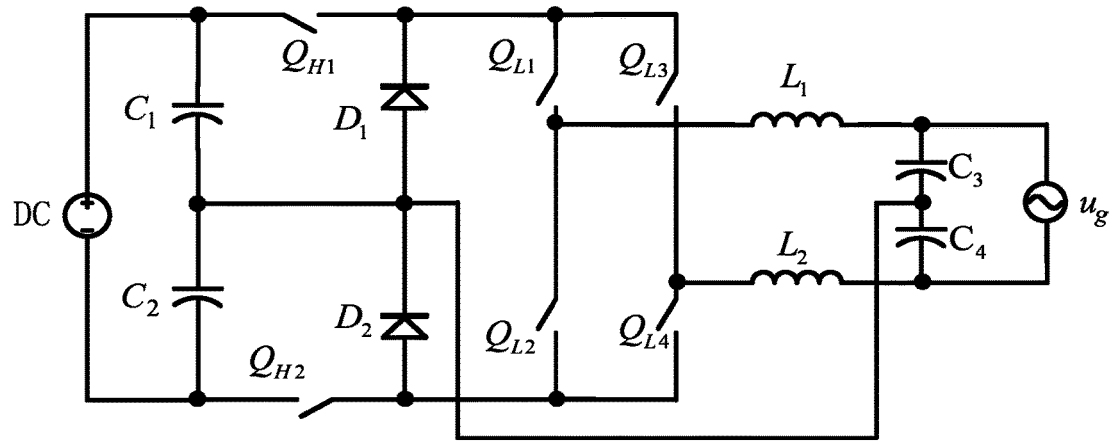
FIG. 2 is a circuit diagram of a five-level inverter according to an embodiment of the disclosure.

Referring to FIG. 2, a five-level inverter according an embodiment of the disclosure is shown. In the present embodiment, the five-level inverter includes: a first switch $Q_{H1}$, a second switch $Q_{H2}$, a third switch $Q_{L1}$, a fourth switch $Q_{L2}$, a fifth switch $Q_{L3}$, a sixth switch $Q_{L4}$, a first capacitor unit $C_1$, a second capacitor unit $C_2$, a third capacitor unit $C_3$, a fourth capacitor unit $C_4$, a first inductor $L_1$, a second inductor $L_2$, a first reverse flow preventive element and a second reverse flow preventive element.

A positive pole of a direct-current power supply DC is connected to a first terminal of the first switch $Q_{H1}$ and a first terminal of the first capacitor unit $C_1$; a negative pole of the direct-current power supply DC is connected to a first terminal of the second switch $Q_{H2}$ and a second terminal of the second capacitor unit $C_2$.

A second terminal of the first switch $Q_{H1}$ is connected to a first terminal of the first reverse flow preventive element, a first terminal of the third switch $Q_{L1}$ and a first terminal of the fifth switch $Q_{L3}$.

A second terminal of the first reverse flow preventive element is connected to a second terminal of the first capacitor unit $C_1$, a first terminal of the second capacitor unit $C_2$ and a first terminal of the second reverse flow preventive element.

A second terminal of the second reverse flow preventive element is connected to a second terminal of the second switch $Q_{H2}$, a first terminal of the fourth switch $Q_{L2}$ and a first terminal of the sixth switch $Q_{L4}$.

A second terminal of the third switch $Q_{L1}$ is connected to a first terminal of the first inductor $L_1$ and a second terminal of the fourth switch $Q_{L2}$; a second terminal of the fifth switch $Q_{L3}$ is connected to a first terminal of the second inductor $L_2$ and a second terminal of the sixth switch $Q_{L4}$.

A second terminal of the first inductor $L_1$ is connected to a first terminal of the third capacitor unit $C_3$; a second terminal of the second inductor $L_2$ is connected to a second terminal of the fourth capacitor unit $C_4$.

A second terminal of the third capacitor unit $C_3$ and a first terminal of the fourth capacitor unit $C_4$ are connected to the second terminal of the first capacitor unit $C_1$.

The first reverse flow preventive element is configured to prevent a current from flowing from the first terminal of the first reverse flow preventive element to the second terminal of the first reverse flow preventive element in a case that the first switch $Q_{H1}$ is turned on; the second reverse flow preventive element is configured to prevent a current from flowing from the first terminal of the second reverse flow preventive element to the second terminal of the second reverse flow preventive element in a case that the second switch $Q_{H2}$ is turned on.

The second terminal of the first inductor $L_1$ and the second terminal of the second inductor $L_2$ are alternate-current output terminals of the inverter which may be connected to a alternate-current grid.

It can be seen from the present embodiments that, in the five-level inverter, a second terminal of the third capacitor unit $C_3$ and a first terminal of the fourth capacitor unit $C_4$ are connected to the second terminal of the first capacitor unit $C_1$. In other words, a common terminal of the third capacitor unit $C_3$ and the fourth capacitor unit $C_4$ is connected to a midpoint of the direct-current bus (i.e., a second terminal of the first capacitor $C_1$). Thus a potential of the midpoint of the direct-current bus relative to the common terminal of the third capacitor unit $C_3$ and the fourth capacitor unit $C_4$ is relatively stable. That is, a potential of the positive pole or the negative pole of the direct-current power supply DC relative to the common terminal of the third capacitor unit $C_3$ and the fourth capacitor unit $C_4$ is relatively stable. The power-frequency or high frequency voltage jump would not occur. The third capacitor unit $C_3$ and the fourth capacitor unit $C_4$ function as an output filtering circuit of the inverter which is typically in connection with a N wire of the grid which has almost the same potential as the ground. Therefore no voltage jump would occur at the positive pole (or negative pole) of the direct-current power supply DC, with respect to ground, thereby the problem of current leakage may be addressed, and efficiency and reliability of the inverter may be enhanced. Further, the five-level inverter according to the embodiment is a double-buck circuit and only six switches are used. Therefore the five-level inverter offers a simple configuration and a lower cost.

According to the present embodiment, an alternate-current gird $u_g$ may be connected between two output terminals of the inverter. The inverter according to the present embodiment is applicable in the field of photovoltaic power generation, and the direct-current power supply DC may be a PV (Photo Voltaics) power supply.

According to the present embodiment, the first switch $Q_{H1}$ and the second switch $Q_{H2}$ may be high-frequency switches, and may perform switching actions at a high frequency during the operation of the inverter. The third switch $Q_{L1}$, the fourth switch $Q_{L2}$, the fifth switch $Q_{L3}$ and the sixth switch $Q_{L4}$ may be low-frequency switches, and may perform switching actions at a low frequency during the operation of the inverter. The term "high frequency" used in the present disclosure is generally referred to a frequency above 1 kHz, and the term "low frequency" is generally referred to a frequency below 1 kHz (which is typically the power frequency, for example, at 50 Hz).

According to the present embodiment, each of the first switch $Q_{H1}$, the second switch $Q_{H2}$, the third switch $Q_{L1}$, the fourth switch $Q_{L2}$, the fifth switch $Q_{L3}$ and the sixth switch $Q_{L4}$ can be any type of switch, such as IGBT and MOS, and each of the switches can be connected with a reverse diode in parallel. In a case that each of the switches is connected with a reverse diode in parallel, a current flows from the first terminal of the first switch $Q_{H1}$ to the second terminal of the first switch $Q_{H1}$ in a case that the first switch $Q_{H1}$ is turned on, that is, an anode of the reverse diode connected in parallel with the first switch $Q_{H1}$ is connected to the second terminal of the first switch $Q_{H1}$, and a cathode of the reverse diode is connected to the first terminal of the first switch $Q_{H1}$. A current flows from the first terminal of the third switch $Q_{L1}$ to the second terminal of the third switch $Q_{L1}$ in a case that the third switch $Q_{L1}$ is turned on; and a current flows from the first terminal of the fifth switch $Q_{L3}$ to the second terminal of the fifth switch $Q_{L3}$ in a case that the fifth switch $Q_{L3}$ is turned on. A current flows from the second terminal of the second switch $Q_{H2}$ to the first terminal of the second switch $Q_{H2}$ in a case that the second switch $Q_{H2}$ is turned on, that is, an anode of the reverse diode connected in parallel with the second switch $Q_{H2}$ is connected to the first terminal of the second switch $Q_{H2}$, and a cathode of the reverse diode connected in parallel with the second switch $Q_{H2}$ is connected to the second terminal of the first switch $Q_{H2}$; a current flows from the second terminal of the fourth switch $Q_{L2}$ to the first terminal of the fourth switch $Q_{L2}$ in a case that the fourth switch $Q_{L2}$ is turned on; and a current flows from the second terminal of the sixth switch $Q_{L4}$ to the first terminal of the sixth switch $Q_{L4}$ in a case that the sixth switch $Q_{L4}$ is turned on.

In the present embodiment, each of the first capacitor unit, the second capacitor unit, the third capacitor unit and the fourth capacitor unit may be an element including capacitors, and the number of the capacitors included in each capacitor unit is not limited. In order to balance the circuit as much as possible, a capacitance of the first capacitor unit may be made equal to a capacitance of the second capacitor unit, or the difference between the capacitance of the first capacitor unit and the capacitance of the second capacitor unit may be made below a first predetermined threshold; and a capacitance of the third capacitor unit may be made equal to a capacitance of the fourth capacitor unit, or the difference between the capacitance of the third capacitor unit and the capacitance of the fourth capacitor unit may be made below a second predetermined threshold. The first predetermined threshold and the second predetermined threshold may be set according to requirements, and may or may not be equal. In order to balance the circuit as much as possible, an inductance of the first inductor may be equal to an inductance of the second inductor, or the difference between the inductance of the first inductor and the inductance of the second inductor may be within a threshold range.

It should be noted that, in the present embodiment, the first reverse flow preventive element is configured to prevent a current from flowing from the first terminal of the first reverse flow preventive element to the second terminal of the first reverse flow preventive element in a case that the first switch $Q_{H1}$ is turned on. The second reverse flow preventive element is configured to prevent a current from flowing from the first terminal of the second reverse flow preventive element to the second terminal of the second reverse flow preventive element in a case that the second switch $Q_{H2}$ is turned on. As shown in FIG. 2, each of the first reverse flow preventive element and the second reverse flow preventive element may be a diode, that is, the first reverse flow preventive element is a diode $D_1$ and the second reverse flow preventive element is a diode $D_2$. That is to say, the first terminal of the first reverse flow preventive element is a cathode of the first diode $D_1$, and the second terminal of the first reverse flow preventive element is an anode of the first diode $D_1$; and the first terminal of the second reverse flow preventive element is a cathode of the second diode $D_2$, and the second terminal of the second reverse flow preventive element is an anode of the second diode $D_2$. Each of the diode $D_1$ and the diode $D_2$ may be such as a silicon carbide diode or a fast recovery diode.

Alternatively, the first reverse flow preventive element and the second reverse flow preventive element may be other devices besides diodes, which is not limited in the disclosure. For example, the first reverse flow preventive element and the second reverse flow preventive element may also be switches. As an example, the first reverse flow preventive element is a seventh switch and the second reverse flow preventive element is an eighth switch. In a case that the first switch $Q_{H1}$ is turned on, the seventh switch is turned off to prevent a current from flowing from the first terminal of the first reverse flow preventive element to the second terminal of the first reverse flow preventive element, and the seventh switch is turned on in a case that the first switch $Q_{H1}$ is turned off. In a case that the second switch $Q_{H2}$ is turned on, the eighth switch is turned off to prevent a current from flowing from the first terminal of the second reverse flow preventive element to the second terminal of the second reverse flow preventive element, and the eighth switch is turned on in a case that the second switch $Q_{H2}$ is turned off. Each of the seventh switch and the eighth switch may be a MOS transistor which may reduce on-state losses.

It should be noted that, the inverter according to the embodiments of the disclosure is applicable to applications where active power is required and applications where both reactive power and active power are required. Hereinafter, various operation modes of the inverter will be described in conjunction with the drawings.

Referring to FIGS. 3a to 3h, six active power operation modes of the inverter according to the present embodiment are described, which includes a first operation mode, a second operation mode, a third operation mode, a fourth operation mode, a fifth operation mode and a sixth operation mode.

Figure 3A:
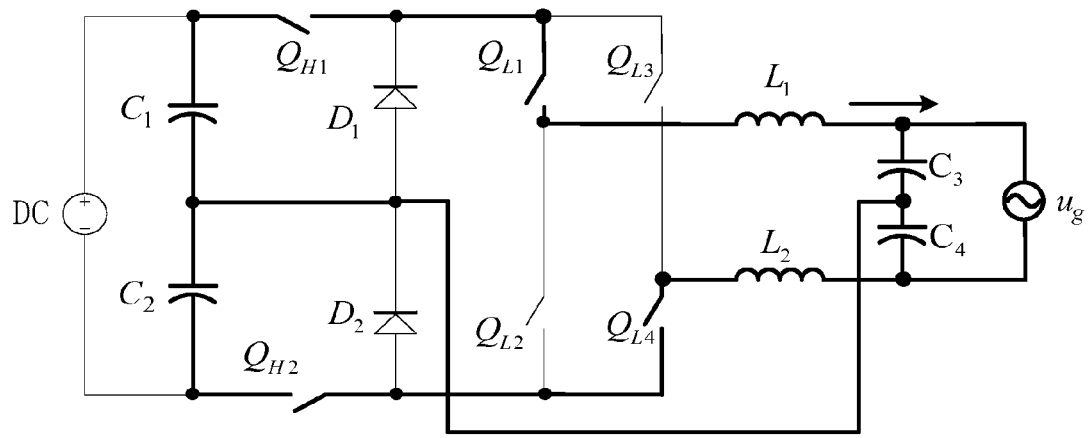
FIG. 3a is a circuit diagram of the inverter shown in FIG. 2 in a first operation mode.

As shown in FIG. 3a, a positive level 2 is outputted by the inverter in a case that the inverter according to the present embodiment is in the first operation mode. In this case, the first switch $Q_{H1}$, the second switch $Q_{H2}$, the third switch $Q_{L1}$ and the sixth switch $Q_{L4}$ are turned on, and the fourth switch $Q_{L2}$ and the fifth switch $Q_{L3}$ are turned off. The first reverse flow preventive element can prevent a current from flowing from a common terminal of the first switch $Q_{H1}$ and the third switch $Q_{L1}$ to a common terminal of the first capacitor unit $C_1$ and the second capacitor unit $C_2$, and the second reverse flow preventive element can prevent a current from flowing from the common terminal of the first capacitor unit $C_1$ and the second capacitor unit $C_2$ to a common terminal of the second switch $Q_{H2}$ and the fourth switch $Q_{L2}$. In a case that the first reverse flow preventive element and the second reverse flow preventive element are switches, both of the switches are turned off. A current flows through the first switch $Q_{H1}$, the third switch $Q_{L1}$, the first inductor $L_1$, the alternate-current grid $u_g$, the second inductor $L_2$, the sixth switch $Q_{L4}$, the second switch $Q_{H2}$, the second capacitor unit $C_2$, and the first capacitor unit $C_1$ successively.

A small current flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the first operation mode, and the current can be relatively low in a case that the third capacitor unit $C_3$ has a capacitance approximating to that of the fourth capacitor unit $C_4$, the first capacitor unit $C_1$ has a capacitance approximating to that of the second capacitor unit $C_2$, and the first inductor $L_1$ has a inductance approximating to that of the second inductor $L_2$.

A positive level 1 is outputted by the inverter in a case that the inverter according to the present embodiment is in the second operation mode. In this case, the inverter may operate in a first operation sub-mode or a second operation sub-mode, which will be described in detail respectively in the following.

Figure 3B:
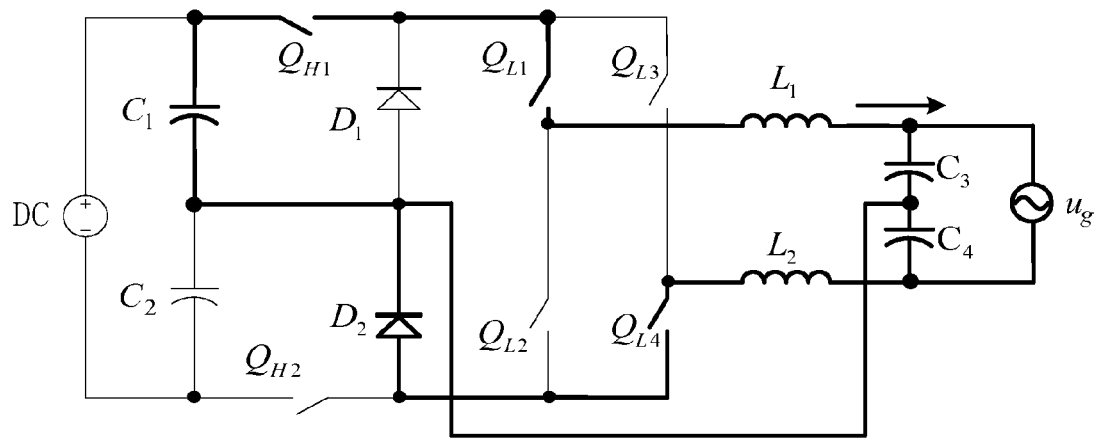
FIG. 3b is a circuit diagram of the inverter shown in FIG. 2 in a first operation sub-mode.

As shown in FIG. 3b, in a case that the inverter according to the present embodiment is in the first operation sub-mode, the first switch $Q_{H1}$, the third switch $Q_{L1}$ and the sixth switch $Q_{L4}$ are turned on, the second switch $Q_{H2}$, the fourth switch $Q_{L2}$ and the fifth switch $Q_{L3}$ are turned off. In this case, the second terminal of the first capacitor unit $C_1$ (i.e., the common terminal of the first capacitor unit $C_1$ and the second capacitor unit $C_2$) is in a charging state. The first reverse flow preventive element can prevent a current from flowing from the common terminal of the first switch $Q_{H1}$ and the third switch $Q_{L1}$ to the common terminal of the first capacitor unit $C_1$ and the second capacitor unit $C_2$. In a case that the first reverse flow preventive element is a switch, the switch is turned off, and in a case that the second reverse flow preventive element is a switch, the switch is turned on. A current flows through the first switch $Q_{H1}$, the third switch $Q_{L1}$, the first inductor $L_1$, the alternate-current grid $u_g$, the second inductor $L_2$, the sixth switch $Q_{L4}$, the second reverse flow preventive element, and the first capacitor unit $C_1$ successively.

Figure 3C:
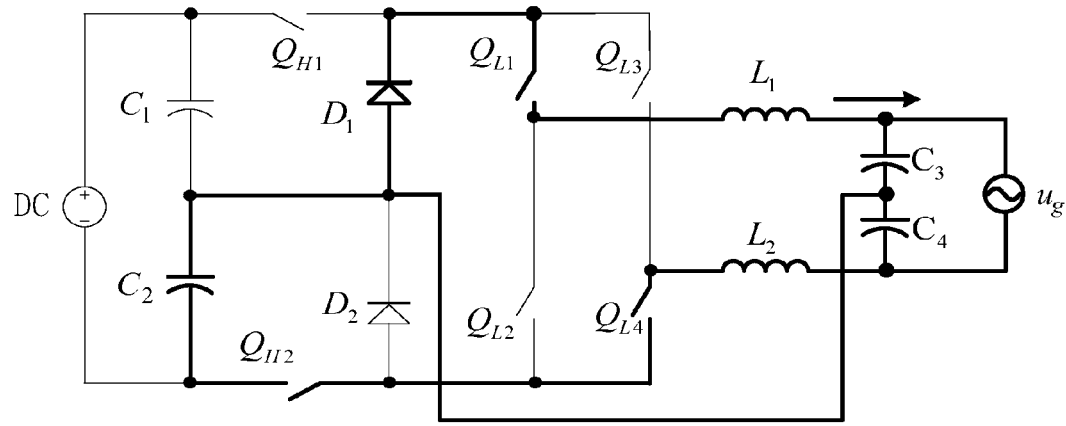
FIG. 3c is a circuit diagram of the inverter shown in FIG. 2 in a second operation sub-mode.

As shown in FIG. 3c, in a case that the inverter according to the present embodiment is in the second operation sub-mode, the second switch $Q_{H2}$, the third switch $Q_{L1}$ and the sixth switch $Q_{L4}$ are turned on, the first switch $Q_{H1}$, the fourth switch $Q_{L2}$ and the fifth switch $Q_{L3}$ are turned off, and the second terminal of the first capacitor unit $C_1$ (i.e., the common terminal of the first capacitor unit $C_1$ and the second capacitor unit $C_2$) is in a discharging state. The second reverse flow preventive element can prevent a current from flowing from the common terminal of the first capacitor unit $C_1$ and the second capacitor unit $C_2$ to the common terminal of the second switch $Q_{H2}$ and the fourth switch $Q_{L2}$. In a case that the second reverse flow preventive element is a switch, the switch is turned off, and in a case that the first reverse flow preventive element is a switch, the switch is turned on. A current flows through the first reverse flow preventive element, the third switch $Q_{L1}$, the first inductor $L_1$, the alternate-current grid $u_g$, the second inductor $L_2$, the sixth switch $Q_{L4}$, the second switch $Q_{H2}$, and the second capacitor unit $C_2$ successively.

A current flows through a connection circuit between a common terminal of the first capacitor unit $C_1$ and the second capacitor unit $C_2$ and a common terminal of the third capacitor unit $C_3$ and the fourth capacitor unit $C_4$ in a case that the inverter is in the first operation sub-mode or the second operation sub-mode.

It can be seen that a positive level 1 is outputted by the inverter in each of the above two operation sub-modes. However, the difference lies in that, the second terminal of the first capacitor unit $C_1$ is in the charging state in a case that the inverter is in the first operation sub-mode, and the second terminal of the first capacitor unit $C_1$ is in the discharging state in a case that the inverter is in the second operation sub-mode.

Figure 3D:
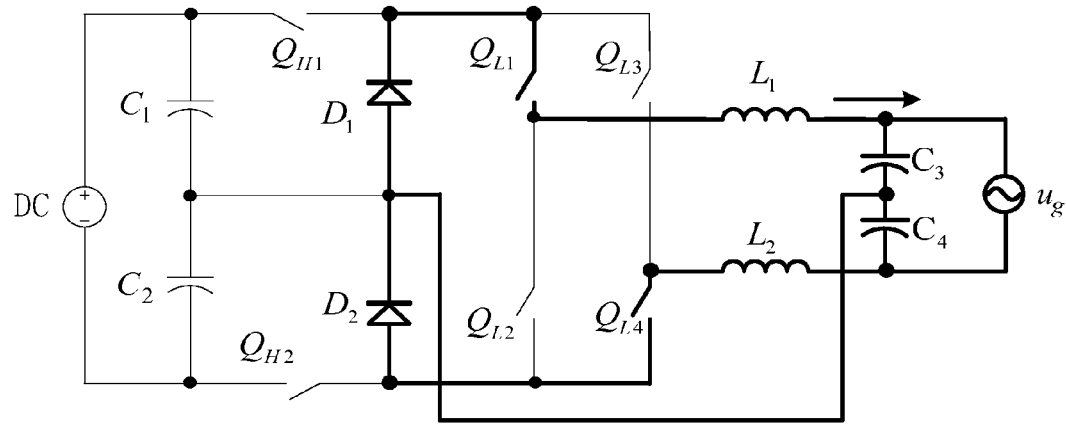
FIG. 3d is a circuit diagram of the inverter shown in FIG. 2 in a third operation mode.

As shown in FIG. 3d, a positive level 0 is outputted by the inverter in a case that the inverter is in the third operation mode. In this case, the third switch $Q_{L1}$ and the sixth switch $Q_{L4}$ are turned on, and the first switch $Q_{H1}$, the second switch $Q_{H2}$, the fourth switch $Q_{L2}$ and the fifth switch $Q_{L3}$ are turned off. In a case that the first reverse flow preventive element and the second reverse flow preventive element are switches, both of the switches are turned on. A current flows through the first reverse flow preventive element, the third switch $Q_{L1}$, the first inductor $L_1$, the alternate-current grid $u_g$, the second inductor $L_2$, the sixth switch $Q_{L4}$, and the second reverse flow preventive element successively.

A small current also flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the third operation mode, and the small current can be relatively low in a case that the third capacitor unit $C_3$ has a capacitance approximating to that of the fourth capacitor unit $C_4$, the first capacitor unit $C_1$ has a capacitance approximating to that of the second capacitor unit $C_2$, and the first inductor $L_1$ has a inductance approximating to that of the second inductor $L_2$.

Figure 3E:
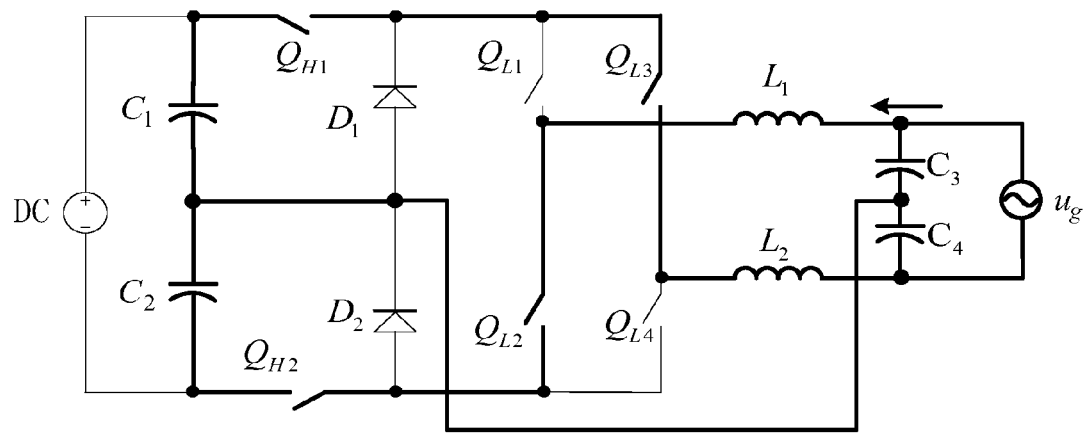
FIG. 3e is a circuit diagram of the inverter shown in FIG. 2 in a fourth operation mode.

As shown in FIG. 3e, a negative level 2 is outputted by the inverter in a case that the inverter according to the present embodiment is in the fourth operation mode. In this case, the first switch $Q_{H1}$, the second switch $Q_{H2}$, the fourth switch $Q_{L2}$ and the fifth switch $Q_{L3}$ are turned on, and the third switch $Q_{L1}$ and the sixth switch $Q_{L4}$ are turned off. The first reverse flow preventive element can prevent a current from flowing from the common terminal of the first switch $Q_{H1}$ and the third switch $Q_{L1}$ to the common terminal of the first capacitor unit $C_1$ and the second capacitor unit $C_2$, and the second reverse flow preventive element can prevent a current from flowing from the common terminal of the first capacitor unit $C_1$ and the second capacitor unit $C_2$ to the common terminal of the second switch $Q_{H2}$ and the fourth switch $Q_{L2}$. In a case that the first reverse flow preventive element and the second reverse flow preventive element are switches, both of the switches are turned off. A current flows through the first switch $Q_{H1}$, the fifth switch $Q_{L3}$, the second inductor $L_2$, the alternate-current grid $u_g$, the first inductor $L_1$, the fourth switch $Q_{L2}$, the second switch $Q_{H2}$, the second capacitor $C_2$, and the first capacitor $C_1$ successively.

A small current flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the fourth operation mode, and the small currents can be relatively low in a case that the third capacitor unit $C_3$ has a capacitance approximating to that of the fourth capacitor unit $C_4$, the first capacitor unit $C_1$ has a capacitance approximating to that of the second capacitor unit $C_2$, and the first inductor $L_1$ has a inductance approximating to that of the second inductor $L_2$.

A negative level 1 is outputted by the inverter in a case that the inverter according to the present embodiment is in the fifth operation mode. In this case, the inverter may operate in a third operation sub-mode or a fourth operation sub-mode, which will be described in detail respectively in the following.

Figure 3F:
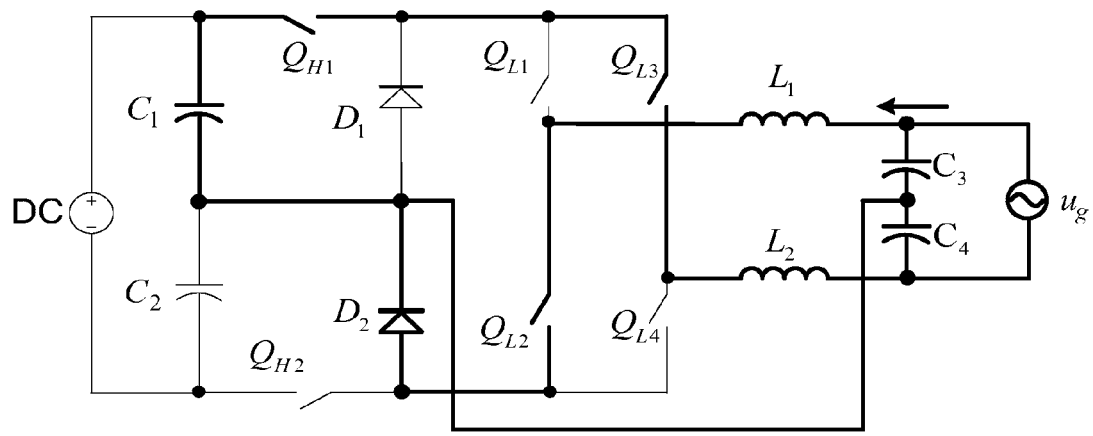
FIG. 3f is a circuit diagram of the inverter shown in FIG. 2 in a third operation sub-mode.

As shown in FIG. 3f, in a case that the inverter according to the present embodiment is in the third operation sub-mode, the first switch $Q_{H1}$, the fourth switch $Q_{L2}$ and the fifth switch $Q_{L3}$ are turned on, the second switch $Q_{H2}$, the third switch $Q_{L1}$ and the sixth switch $Q_{L4}$ are turned off. In this case, the second terminal of the first capacitor unit $C_1$ (i.e., the common terminal of the first capacitor unit $C_1$ and the second capacitor unit $C_2$) is in a charging state. The first reverse flow preventive element can prevent a current from flowing from the common terminal of the first switch $Q_{H1}$ and the third switch $Q_{L1}$ to the common terminal of the first capacitor unit $C_1$ and the second capacitor unit $C_2$. In a case that the first reverse flow preventive element is a switch, the switch is turned off, and in a case that the second reverse flow preventive element is a switch, the switch is turned on. A current flows through the first switch $Q_{H1}$, the fifth switch $Q_{L3}$, the second inductor $L_2$, the alternate-current grid $u_g$, the first inductor $L_1$, the fourth switch $Q_{L2}$, the second reverse flow preventive element, and the first capacitor unit $C_1$ successively.

Figure 3G:
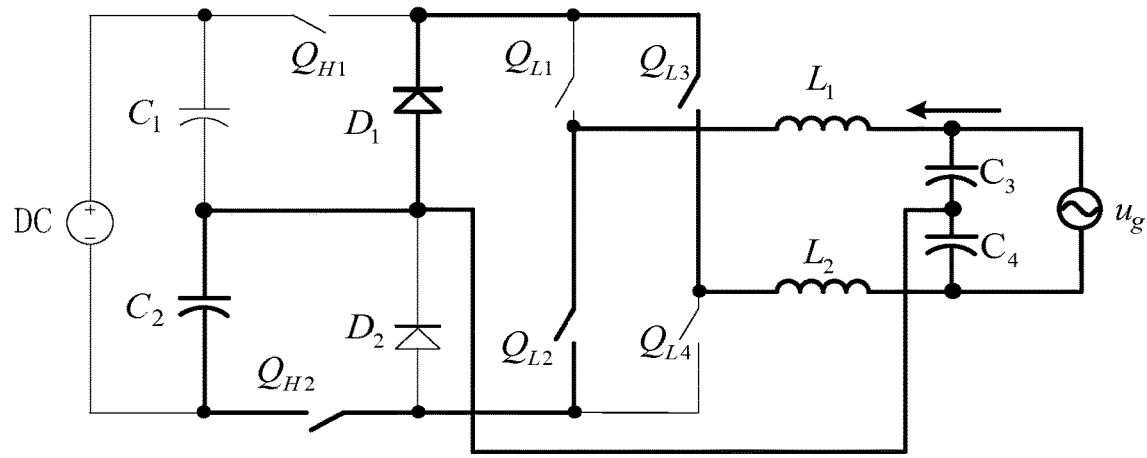
FIG. 3g is a circuit diagram of the inverter shown in FIG. 2 in a fourth operation sub-mode.

As shown in FIG. 3g, in a case that the inverter according to the present embodiment is in the fourth operation sub-mode, the second switch $Q_{H2}$, the fourth switch $Q_{L2}$ and the fifth switch $Q_{L3}$ are turned on, the first switch $Q_{H1}$, the third switch $Q_{L1}$ and the sixth switch $Q_{L4}$ are turned off, and the second terminal of the first capacitor unit $C_1$ (i.e., the common terminal of the first capacitor unit $C_1$ and the second capacitor unit $C_2$) is in the discharging state. The second reverse flow preventive element can prevent a current from flowing from the common terminal of the first capacitor unit $C_1$ and the second capacitor unit $C_2$ to the common terminal of the second switch $Q_{H2}$ and the fourth switch $Q_{L2}$. In a case that the second reverse flow preventive element is a switch, the switch is turned off, and in a case that the first reverse flow preventive element is a switch, the switch is turned on. A current flows through the first reverse flow preventive element, the fifth switch $Q_{L3}$, the second inductor $L_2$, the alternate-current grid $u_g$, the first inductor $L_1$, the fourth switch $Q_{L2}$, the second switch $Q_{H2}$, and the second capacitor unit $C_2$ successively.

A current flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the third operation sub-mode or the fourth operation sub-mode.

It can be seen that a negative level 1 is outputted by the inverter in each of the above two operation sub-mode. However, the difference lies in that, the second terminal of the first capacitor unit $C_1$ is in the charging state in a case that the inverter is in the third operation sub-mode, and the second terminal of the first capacitor unit $C_1$ is in the discharging state in a case that the inverter is in the fourth operation sub-mode.

Figure 3H:
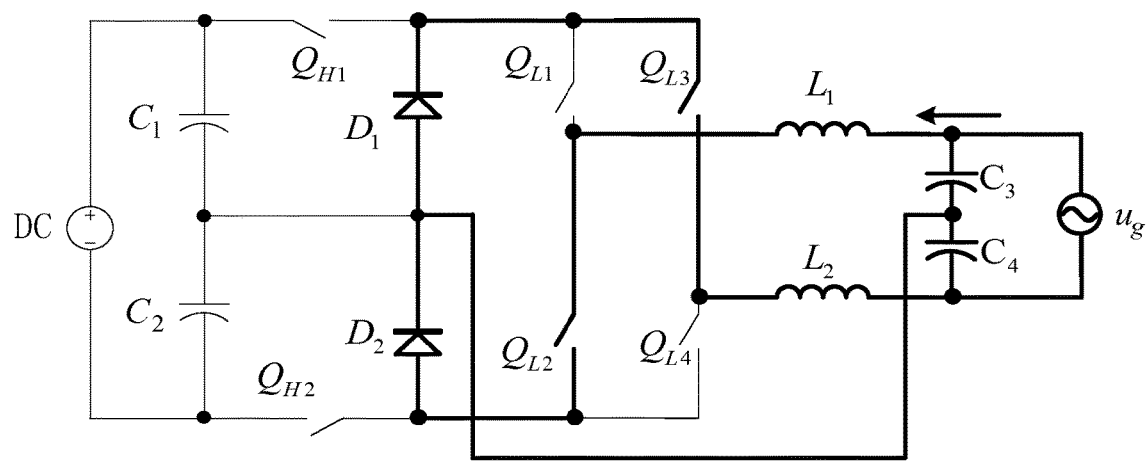
FIG. 3h is a circuit diagram of the inverter shown in FIG. 2 in a sixth operation mode.

As shown in FIG. 3h, a negative level 0 is outputted by the inverter in a case that the inverter according to the present embodiment is in the sixth operation mode. In this case, the fourth switch $Q_{L2}$ and the fifth switch $Q_{L3}$ are turned on, and the first switch $Q_{H1}$, the second switch $Q_{H2}$, the third switch $Q_{L1}$ and the sixth switch $Q_{L4}$ are turned off. In a case that the first reverse flow preventive element and the second reverse flow preventive element are switches, both of the switches are turned on. A current flows through the first reverse flow preventive element, the fifth switch $Q_{L3}$, the second inductor $L_2$, the alternate-current grid $u_g$, the first inductor $L_1$, the fourth switch $Q_{L2}$, and the second reverse flow preventive element successively.

A small current also flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the sixth operation mode, and the small current can be relatively low in a case that the third capacitor unit $C_3$ has a capacitance approximating to that of the fourth capacitor unit $C_4$, the first capacitor unit $C_1$ has a capacitance approximating to that of the second capacitor unit $C_2$, and the first inductor $L_1$ has a inductance approximating to that of the second inductor $L_2$.

The inverter may output a periodic signal in each of the above six active operation modes. A period of the periodic signal outputted by the inverter includes a first time interval, a second time interval, a third time interval, a fourth time interval, a fifth time interval and a sixth time interval; where the inverter outputs a positive voltage during the first time interval, the second time interval and the third time interval, and outputs a negative voltage during the fourth time interval, the fifth time interval and the sixth time interval.

In an embodiment, the inverter is configured to operate in the second operation mode and the third operation mode alternately and output a positive level 1 and a positive level 0 alternately during each of the first time interval and the third time interval.

In an embodiment, the inverter is configured to operate in the first operation mode and the second operation mode alternately and output a positive level 1 and a positive level 2 alternately during the second time interval.

In an embodiment, the inverter is configured to operate in the fifth operation mode and the sixth operation mode alternately and output a negative level 1 and a negative level 0 alternately during each of the fourth time interval and the sixth time interval.

In an embodiment, the inverter is configured to operate in the fourth operation mode and the fifth operation mode alternately and output a negative level 1 and a negative level 2 alternately during the fifth time interval.

It should be noted that, the inverter may specifically operate in the first operation sub-mode or the second operation sub-mode in a case that the inverter is in the second operation mode, and the inverter may specifically operate in the third operation sub-mode or the fourth operation sub-mode in a case that the inverter is in the fifth operation mode. The second terminal of the first capacitor $C_1$ is in the charging state in a case that the inverter is in the first operation sub-mode and the third operation sub-mode, and in the discharging state in a case that the inverter is in the second operation sub-mode and the fourth operation sub-mode. Thus, in an exemplary embodiment, it is preferred that, in a period, a duration for which the second terminal of the capacitor $C_1$ (i.e., the midpoint of the direct-current bus) is in the charging state may be made equal to a duration for which the second terminal of the capacitor $C_1$ (i.e., the midpoint of the direct-current bus) is in the discharging state, or the difference between the duration for which the second terminal of the capacitor $C_1$ (i.e., the midpoint of the direct-current bus) is in the charging state and the duration for which the second terminal of the capacitor $C_1$ (i.e., the midpoint of the direct-current bus) is in the discharging state may be made below a predetermined threshold by adjusting the allocation of the second operation mode and the fifth operation mode, thereby stabilizing a voltage at the midpoint of the direct-current bus as much as possible. Hereinafter, three allocation schemes for stabilizing the voltage at the midpoint of the direct-current bus as much as possible will be described.

In a first allocation scheme, the second terminal of the first capacitor unit is in the same state, which may be the charging state or the discharging state, during the first time interval, the second time interval and the third time interval.

The second terminal of the first capacitor unit is in the same charge-discharge state during the fourth time interval, the fifth time interval and the sixth time interval, where the same charge-discharge state of the second terminal of the first capacitor unit during fourth time interval, the fifth time interval and the sixth time interval is opposite to the charge-discharge state of the second terminal of the first capacitor unit during the first time interval, the second time interval and the third time interval. For example, in a case that the second terminal of the first capacitor unit is in the charging state during the first time interval, the second time interval and the third time interval, the second terminal of the first capacitor unit should be in the discharging state during the fourth time interval, the fifth time interval and the sixth time interval; and in a case that the second terminal of the first capacitor unit is in the discharging state during the first time interval, the second time interval and the third time interval, the second terminal of the first capacitor unit should be in the charging state during the fourth time interval, the fifth time interval and the sixth time interval.

Particularly, in a case that the second terminal of the first capacitor unit is in the charging state during the first time interval (or the third time interval), it is indicated that the inverter operates in the first operation sub-mode and the third operation mode alternately during the first time interval (or the third time interval), and in a case that the second terminal of the first capacitor unit is in the discharging state during the first time interval (or the third time interval), it is indicated that the inverter operates in the second operation sub-mode and the third operation mode alternately during the first time interval (or the third time interval); in a case that the second terminal of the first capacitor unit is in the charging state during the second time interval, it is indicated that the inverter operates in the first operation sub-mode and the first operation mode alternately during the second time interval, and in a case that the second terminal of the first capacitor unit is in the discharging state during the second time interval, it is indicated that the inverter operates in the second operation sub-mode and the first operation mode alternately during the second time interval.

In a case that the second terminal of the first capacitor unit is in the charging state during the fourth time interval (or the sixth time interval), it is indicated that the inverter operates in the third operation sub-mode and the sixth operation mode alternately during the fourth time interval (or the sixth time interval), and in a case that the second terminal of the first capacitor unit is in the discharging state during the fourth time interval (or the sixth time interval), it is indicated that the inverter operates in the fourth operation sub-mode and the sixth operation mode alternately during the fourth time interval (or the sixth time interval); in a case that the second terminal of the first capacitor unit is in the charging state during the fifth time interval, it is indicated that the inverter operates in the third operation sub-mode and the fourth operation mode alternately during the fifth time interval, and in a case that the second terminal of the first capacitor unit is in the discharging state during the fifth time interval, it is indicated that the inverter operates in the fourth operation sub-mode and the fourth operation mode alternately during the fifth time interval.

Figure 4:
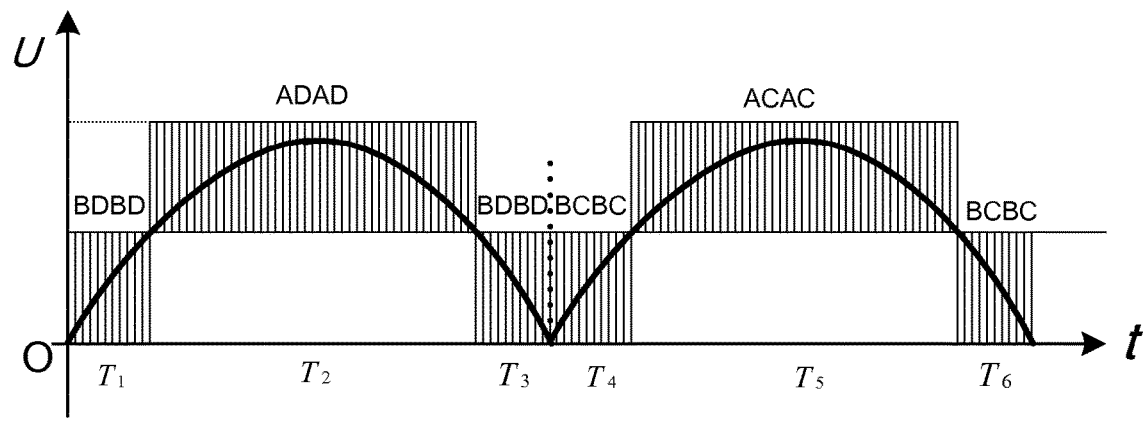
FIG. 4 is a schematic diagram of a mode switching control fashion of a first allocation scheme for a corresponding charge-discharge state of a midpoint of a direct-current bus.

A mode switching control fashion for the allocation scheme is described in detail below with reference to FIG. 4. As shown in FIG. 4, in an embodiment, the inverter is configured to be in a B mode and a D mode alternately during each of the first time interval T1 and the third time interval T3, in an A mode and the D mode alternately during the second time interval T2, in a C mode and the D mode alternately during each of the fourth time interval T4 and the sixth time interval T6, and to be in the A mode and the C mode alternately during the fifth time interval T5. It should be noted that, FIG. 4 is a schematic diagram of mode switching control for the inverter. Therefore, in FIG. 4, a signal of a negative level outputted by the inverter is reversed to a signal of a positive level.

Particularly, the A mode is the first operation mode in which the positive level 2 is outputted or the fourth operation mode in which the negative level 2 is outputted; the B mode is the third operation mode in which the positive level 0 is outputted or the sixth operation mode in which the negative level 0 is outputted; the C mode is the first operation sub-mode in which the positive level 1 is outputted and the voltage at the midpoint of the direct-current bus is in a charging state or the third operation sub-mode in which the negative level 1 is outputted and the voltage at the midpoint of the direct-current bus is in a charging state; and the D mode is the second operation sub-mode in which the positive level 1 is outputted and the voltage at the midpoint of the direct-current bus is in a discharging state or the fourth operation sub-mode in which the negative level 1 is outputted and the voltage at the midpoint of the direct-current bus is in a discharging state.

As can be seen from FIG. 4, the voltage at the midpoint of the direct-current bus is in the discharging state during the first time interval T1, the second time interval T2 and the third time interval T3, which are first half period of the periodic signal, and the voltage at the midpoint of the direct-current bus is in the charging stage during the fourth time interval T4, the fifth time interval T5 and the sixth time interval T6, which are latter half period of the periodic signal. Generally, the duration of the first time interval, the duration of the third time interval, the duration of the fourth time interval and the duration of the sixth time interval are all equal to each other, and the duration of the second time interval is equal to the duration of the fifth time interval. Therefore, in this allocation scheme, a charging duration of the voltage at the midpoint of the direct-current bus is equal to a discharging duration of the voltage at the midpoint of the direct-current bus, thereby ensuring that the voltage at the midpoint of the direct-current bus is stabilized.

In a second allocation scheme, the second terminal of the first capacitor unit is in the same state, which may be the charging state or the discharging state, during the first time interval, a latter half of the second time interval, a first half of the fifth time interval and the sixth time interval.

The second terminal of the first capacitor unit is in the same charge-discharge state during a first half of the second time interval, the third time interval, the fourth time interval and a latter half of the fifth time interval, where the same charge-discharge state of the second terminal of the first capacitor unit during the first half of the second time interval, the third time interval, the fourth time interval and the latter half of the fifth time interval is opposite to the charge-discharge state of the second terminal of the first capacitor unit during the first time interval, the latter half of the second time interval, the first half of the fifth time interval and the sixth time interval. For example, in a case that the second terminal of the first capacitor unit is in the charging state during the first time interval, the latter half of the second time interval, the first half of the fifth time interval and the sixth time interval, the second terminal of the first capacitor unit should be in the discharging state during the first half of the second time interval, the third time interval, the fourth time interval and the latter half of the fifth time interval; and in a case that the second terminal of the first capacitor unit is in the discharging state during the first time interval, the latter half of the second time interval, the first half of the fifth time interval and the sixth time interval, the second terminal of the first capacitor unit should be in the charging state during the first half of the second time interval, the third time interval, the fourth time interval and the latter half of the fifth time interval.

Figure 5:
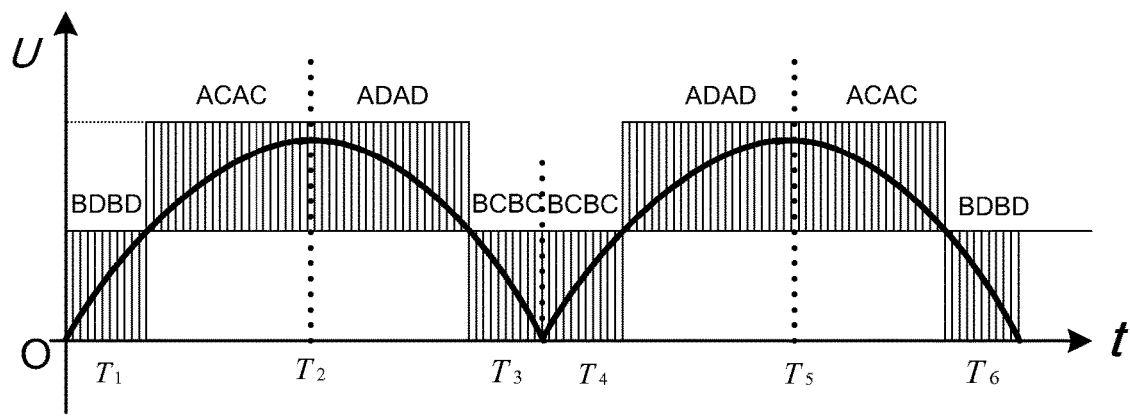
FIG. 5 is a schematic diagram of a mode switching control fashion of a second allocation scheme for a corresponding charge-discharge state of the midpoint of the direct-current bus.

A mode switching control fashion for the allocation scheme is described in detail below with reference to FIG. 5. As shown in FIG. 5, in an embodiment, the inverter is configured to be in a B mode and a D mode alternately during each of the first time interval T1 and the sixth time interval T6, in an A mode and the D mode alternately during each of the latter half of the second time interval T2 and the first half of the fifth time interval T5, in the B mode and the C mode alternately during each of the third time interval T3 and the fourth time interval T4, and in the A mode and the C mode alternately during each of the first half of the second time interval T2 and the latter half of the fifth time interval T5. It should be noted that, FIG. 5 is a schematic diagram of mode switching control for the inverter. Therefore, in FIG. 5, a signal of negative level outputted by the inverter is reversed to a signal of positive level.

As can be seen from FIG. 5, the voltage at the midpoint of the direct-current bus is in the discharging state during the first time interval T1, a latter half of the second time interval T2, a first half of the fifth time interval T5 and the sixth time interval T6, and the voltage at the midpoint of the direct-current bus is in the charging stage during the third time interval T3, the fourth time interval T4, the first half of the second time interval T2, and the later half of the fifth time interval T5. Therefore, in this allocation scheme, a charging duration of the voltage at the midpoint of the direct-current bus is equal to a discharging duration of the voltage at the midpoint of the direct-current bus, thereby ensuring that the voltage at the midpoint of the direct-current bus is stabilized.

In a third allocation scheme, the second terminal of the first capacitor unit is in the same state, which may be the charging state or the discharging state, during the first time interval, a latter half of the second time interval, a fourth time interval and a later half of the fifth time interval.

The second terminal of the first capacitor unit is in the same charge-discharge state during a first half of the second time interval, the third time interval, a first half of the fifth time interval, and the sixth time interval, where the same charge-discharge state of the second terminal of the first capacitor unit during the first half of the second time interval, the third time interval, the first half of the fifth time interval, and the sixth time interval is opposite to the charge-discharge state of the second terminal of the first capacitor unit during the first time interval, the latter half of the second time interval, the fourth time interval and the later half of the fifth time interval. For example, in a case that the second terminal of the first capacitor unit is in the charging state during the first time interval, the latter half of the second time interval, the fourth time interval and the later half of the fifth time interval, the second terminal of the first capacitor unit should be in the discharging state during the first half of the second time interval, the third time interval, the first half of the fifth time interval, and the sixth time interval; and in a case that the second terminal of the first capacitor unit is in the discharging state during the first time interval, the latter half of the second time interval, the fourth time interval and the later half of the fifth time interval, the second terminal of the first capacitor unit should be in the charging state during the first half of the second time interval, the third time interval, the first half of the fifth time interval, and the sixth time interval.

Figure 6:
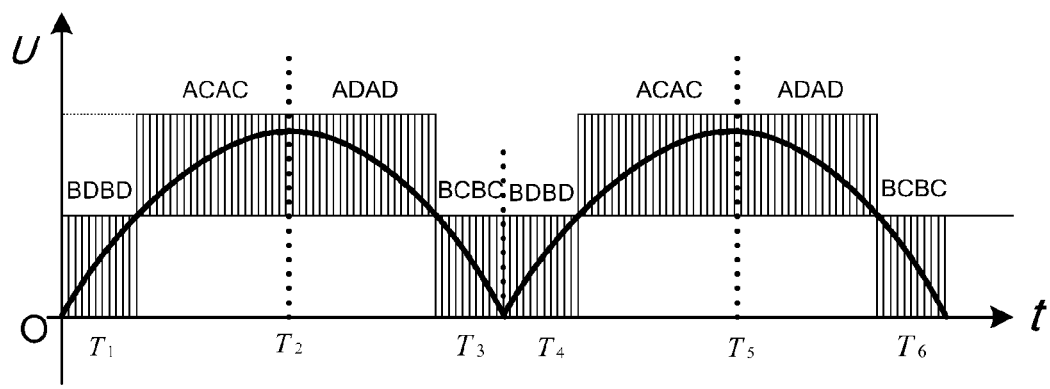
FIG. 6 is a schematic diagram of a mode switching control fashion of a third allocation scheme for a corresponding charge-discharge state of the midpoint of the direct-current bus.

A mode switching control fashion for the allocation scheme is described in detail below with reference to FIG. 6. As shown in FIG. 6, in an embodiment, the inverter is configured to be in a B mode and a D mode alternately during each of the first time interval T1 and the fourth time interval T4, in an A mode and the D mode alternately during each of the latter half of the second time interval T2 and the later half of the fifth time interval T5, in the B mode and the C mode alternately during each of the third time interval T3 and the sixth time interval T6, and in the A mode and the C mode alternately during each of a first half of the second time interval T2 and a first half of the fifth time interval T5.

It should be noted that, FIG. 6 is a schematic diagram of mode switching control for the inverter. Therefore, in FIG. 6, a signal of negative level outputted by the inverter is reversed to a signal of positive level.

As can be seen from FIG. 6, the voltage at the midpoint of the direct-current bus is in the discharging state during the first time interval T1, the later half of the second time interval T2, the later half of the fifth time interval T5, and the fourth time interval T4, and the voltage at the midpoint of the direct-current bus is in the charging stage during the third time interval T3, the sixth time interval T6, the first half of the second time interval T2, and the first half of the fifth time interval T5. Therefore, in this allocation scheme, a charging duration of the voltage at the midpoint of the direct-current bus is equal to a discharging duration of the voltage at the midpoint of the direct-current bus, thereby ensuring that the voltage at the midpoint of the direct-current bus is stabilized.

In the above three allocation schemes, each of charge and discharge of the midpoint of the direct-current bus is performed once during one period in the first allocation scheme thereby resulting in a power-frequency (typically 50 Hz) harmonic, each of charge and discharge of the midpoint of the direct-current bus is performed three times during one period in the second allocation scheme thereby resulting in a harmonic at a frequency which are several times the power frequency, and each of charge and discharge of the midpoint of the direct-current bus is performed four times during one period in the third allocation scheme. Obviously, the third allocation scheme has the highest charge-discharge frequency, and therefore has the lowest bus voltage ripple, while the first allocation scheme has the lowest charge-discharge frequency, and therefore has the highest bus voltage ripple.

Figure 7A:
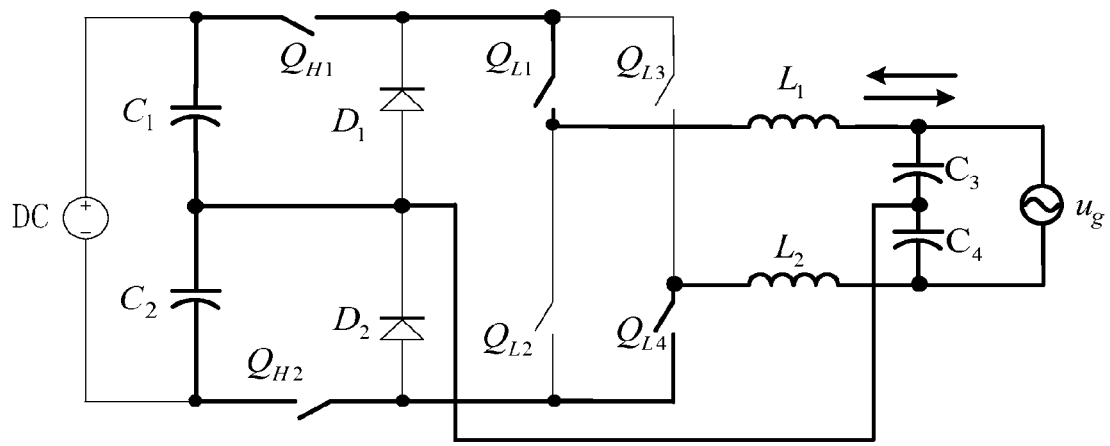
FIG. 7a is a circuit diagram of the inverter shown in FIG. 2 in a seventh operation mode.
Figure 7B:
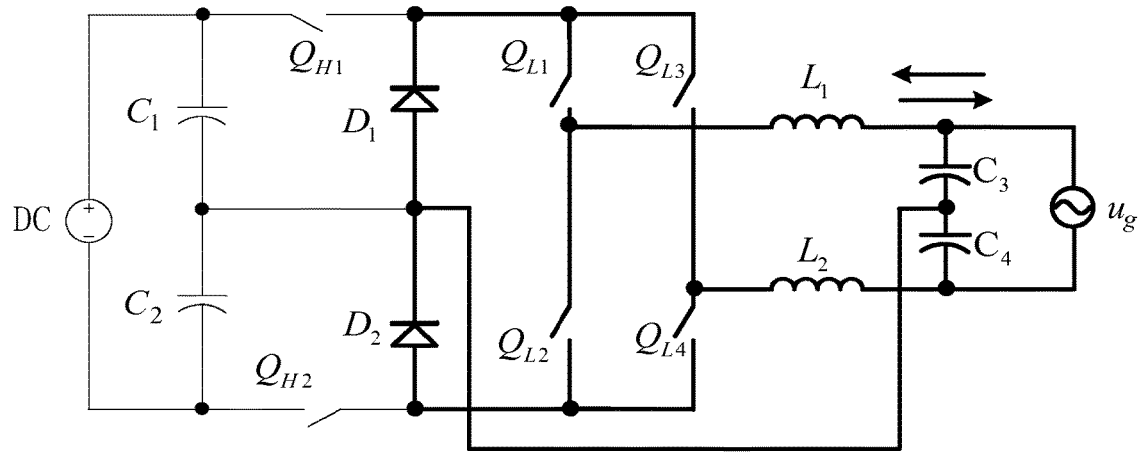
FIG. 7b is a circuit diagram of the inverter shown in FIG. 2 in an eighth operation mode.
Figure 7C:
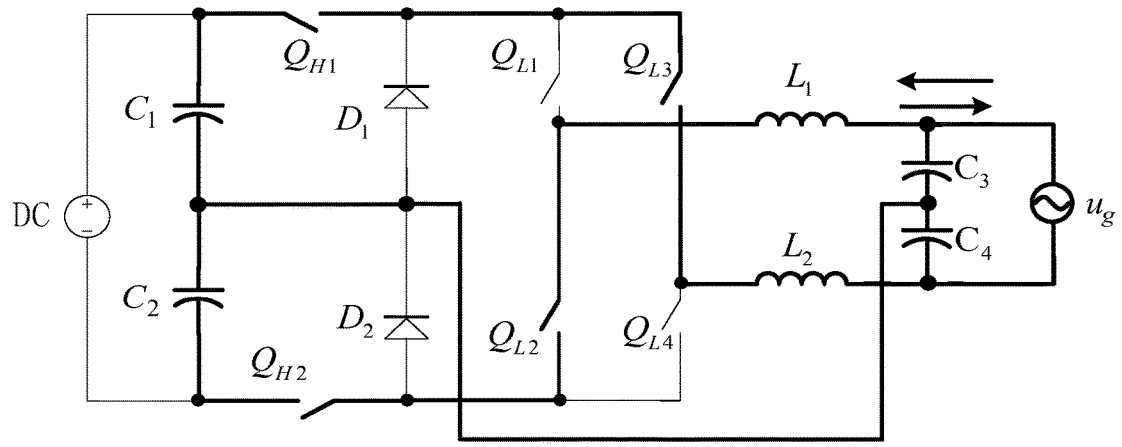
FIG. 7c is a circuit diagram of the inverter shown in FIG. 2 in a ninth operation mode.

As shown in FIGS. 7a to 7c, the inverter according to the present exemplary embodiment is configured to operate in three passive operation modes which includes a seventh operation mode, an eighth operation mode and a ninth operation mode.

As shown in FIG. 7a, a positive level 1 is outputted by the inverter in a case that the inverter according to the present embodiment is in the seventh operation mode. In this case, the first switch $Q_{H1}$, the second switch $Q_{H2}$, the third switch $Q_{L1}$ and the sixth switch $Q_{L4}$ are turned on, and the fourth switch $Q_{L2}$ and the fifth switch $Q_{L3}$ are turned off. The first reverse flow preventive element can prevent a current from flowing from a common terminal of the first switch $Q_{H1}$ and the third switch $Q_{L1}$ to a common terminal of the first capacitor unit $C_1$ and the second capacitor unit $C_2$, and the second reverse flow preventive element can prevent a current from flowing from the common terminal of the first capacitor unit $C_1$ and the second capacitor unit $C_2$ to a common terminal of the second switch $Q_{H2}$ and the fourth switch $Q_{L2}$. In a case that the first reverse flow preventive element and the second reverse flow preventive element are switches, both of the switches are turned off. A current flows through the first switch $Q_{H1}$, the third switch $Q_{L1}$, the first inductor $L_1$, the alternate-current grid $u_g$, the second inductor $L_2$, the sixth switch $Q_{L4}$, the second switch $Q_{H2}$, the second capacitor unit $C_2$, and the first capacitor unit $C_1$ successively. The current may also flow through the above path reversely.

A small current flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the seventh operation mode, and the small current can be relatively low in a case that the third capacitor unit $C_3$ has a capacitance approximating to that of the fourth capacitor unit $C_4$, the first capacitor unit $C_1$ has a capacitance approximating to that of the second capacitor unit $C_2$, and the first inductor $L_1$ has a inductance approximating to that of the second inductor $L_2$.

As shown in FIG. 7b, a level 0 is outputted by the inverter in a case that the inverter according to the present embodiment is in the eighth operation mode. In this case, the third switch $Q_{L1}$, the fourth switch $Q_{L2}$, the fifth switch $Q_{L3}$ and the sixth switch $Q_{L4}$ are turned on, and the first switch $Q_{H1}$ and the second switch $Q_{H2}$ are turned off. In a case that the first reverse flow preventive element and the second reverse flow preventive element are switches, both of the switches are turned on. A current flows through the first reverse flow preventive element, the third switch $Q_{L1}$, the first inductor $L_1$, the alternate-current grid $u_g$, the second inductor $L_2$, the sixth switch $Q_{L4}$, and the second reverse flow preventive element successively. The current may also flow through the first reverse flow preventive element, the fifth switch $Q_{L3}$, the second inductor $L_2$, the alternate-current grid $u_g$, the first inductor $L_1$, the fourth switch $Q_{L2}$, and the second reverse flow preventive element successively.

A small current flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the eighth operation mode, and the small current can be relatively low in a case that the third capacitor unit $C_3$ has a capacitance approximating to that of the fourth capacitor unit $C_4$, the first capacitor unit $C_1$ has a capacitance approximating to that of the second capacitor unit $C_2$, and the first inductor $L_1$ has a inductance approximating to that of the second inductor $L_2$.

As shown in FIG. 7c, a negative level 1 is outputted by the inverter in a case that the inverter according to the present embodiment is in the ninth operation mode. In this case, the first switch $Q_{H1}$, the second switch $Q_{H2}$, the fourth switch $Q_{L2}$ and the fifth switch $Q_{L3}$ are turned on, and the third switch $Q_{L1}$ and the sixth switch $Q_{L4}$ are turned off. The first reverse flow preventive element can prevent a current from flowing from a common terminal of the first switch $Q_{H1}$ and the third switch $Q_{L1}$ to a common terminal of the first capacitor unit $C_1$ and the second capacitor unit $C_2$, and the second reverse flow preventive element can prevent a current from flowing from the common terminal of the first capacitor unit $C_1$ and the second capacitor unit $C_2$ to a common terminal of the second switch $Q_{H2}$ and the fourth switch $Q_{L2}$. In a case that the first reverse flow preventive element and the second reverse flow preventive element are switches, both of the switches are turned off. A current flows through the first switch $Q_{H1}$, the fifth switch $Q_{L3}$, the second inductor $L_2$, the alternate-current grid $u_g$, the first inductor $L_1$, the fourth switch $Q_{L2}$, the second switch $Q_{H2}$, the second capacitor unit $C_2$, and the first capacitor unit $C_1$ successively. The current may also flow through the above path reversely.

A small current flows through a connection circuit between the common terminal of the first capacitor unit $C_1$ and the second capacitor unit $C_2$ and the common terminal of the third capacitor unit $C_3$ and the fourth capacitor unit $C_4$ in a case that the inverter is in the ninth operation mode, and the small current can be relatively low in a case that the third capacitor unit $C_3$ has a capacitance approximating to that of the fourth capacitor unit $C_4$, the first capacitor unit $C_1$ has a capacitance approximating to that of the second capacitor unit $C_2$, and the first inductor $L_1$ has a inductance approximating to that of the second inductor $L_2$.

Figure 8:
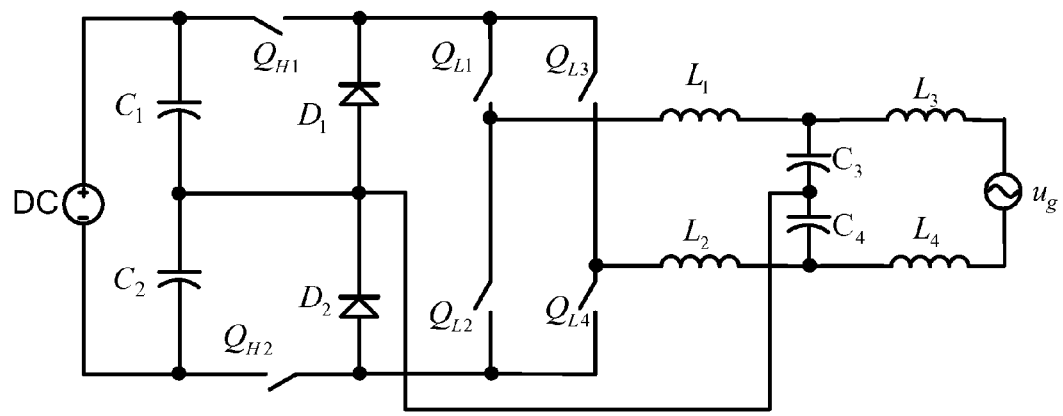
FIG. 8 is a circuit diagram of the inverter shown in FIG. 2 according to an exemplary embodiment of the disclosure.

An inductor for filtering may be connected in serial between each of the two output terminals of the inverter according to the present embodiment and the alternate-current grid to achieve a better current quality of the alternate-current grid. As shown in FIG. 8, the second terminal of the first inductor $L_1$ also may be connected to the positive pole of the alternate-current grid $u_g$ via a third inductor $L_3$, and the second terminal of the second inductor $L_2$ also may be connected to the negative pole of the alternate-current grid $u_g$ via a fourth inductor $L_4$, where the inductance values of the third inductor $L_3$ and the fourth inductor $L_4$ are relatively small as compared to the first inductor $L_1$ and the second inductor $L_2$.

What has been described above are merely exemplary embodiments of the disclosure. It should be noted that, for those persons skilled in the art, improvements and modifications may also be made without departing from the teachings of the disclosure. Those improvements and modifications should also be included in the scope of protection.

What is claimed is:

1. A five-level inverter, comprising: a first switch, a second switch, a third switch, a fourth switch, a fifth switch, a sixth switch, a first capacitor unit, a second capacitor unit, a third capacitor unit, a fourth capacitor unit, a first inductor, a second inductor, a first reverse flow preventive element and a second reverse flow preventive element; wherein
    a positive pole of a direct-current power supply is connected to a first terminal of the first switch and a first terminal of the first capacitor unit; a negative pole of the direct-current power supply is connected to a first terminal of the second switch and a second terminal of the second capacitor unit;
    a second terminal of the first switch is connected to a first terminal of the first reverse flow preventive element, a first terminal of the third switch and a first terminal of the fifth switch;
    a second terminal of the first reverse flow preventive element is connected to a second terminal of the first capacitor unit, a first terminal of the second capacitor unit and a first terminal of the second reverse flow preventive element;
    a second terminal of the second reverse flow preventive element is connected to a second terminal of the second switch, a first terminal of the fourth switch and a first terminal of the sixth switch;
    a second terminal of the third switch is connected to a first terminal of the first inductor and a second terminal of the fourth switch; a second terminal of the fifth switch is connected to a first terminal of the second inductor and a second terminal of the sixth switch;
    a second terminal of the first inductor is connected to a first terminal of the third capacitor unit; a second terminal of the second inductor is connected to a second terminal of the fourth capacitor unit;
    a second terminal of the third capacitor unit and a first terminal of the fourth capacitor unit are connected to the second terminal of the first capacitor unit;
    the first reverse flow preventive element is configured to prevent a current from flowing from the first terminal of the first reverse flow preventive element to the second terminal of the first reverse flow preventive element in a case that the first switch is turned on;
    the second reverse flow preventive element is configured to prevent a current from flowing from the first terminal of the second reverse flow preventive element to the second terminal of the second reverse flow preventive element in a case that the second switch is turned on; and
    the second terminal of the first inductor and the second terminal of the second inductor are alternate-current output terminals of the inverter,
    wherein the inverter is configured to operate in six active operation modes which comprises a first operation mode, a second operation mode, a third operation mode, a fourth operation mode, a fifth operation mode and a sixth operation mode, wherein:
        the first switch, the second switch, the third switch and the sixth switch are turned on, and the fourth switch and the fifth switch are turned off, in a case that the inverter is in the first operation mode;
        the inverter is configured to operate in a first operation sub-mode or a second operation sub-mode in a case that the inverter is in the second operation mode; the first switch, the third switch and the sixth switch are turned on, the second switch, the fourth switch and the fifth switch are turned off, the second terminal of the first capacitor unit is in a charging state, in a case that the inverter is in the first operation sub-mode; and the second switch, the third switch and the sixth switch are turned on, the first switch, the fourth switch and the fifth switch are turned off, and the second terminal of the first capacitor unit is in a discharging state, in a case that the inverter is in the second operation sub-mode;
        the third switch and the sixth switch are turned on, and the first switch, the second switch, the fourth switch and the fifth switch are turned off, in a case that the inverter is in the third operation mode;
        the first switch, the second switch, the fourth switch and the fifth switch are turned on, and the third switch and the sixth switch are turned off, in a case that the inverter is in the fourth operation mode;
        the inverter is configured to operate in a third operation sub-mode or a fourth operation sub-mode in a case that the inverter is in the fifth operation mode; the first switch, the fourth switch and the fifth switch are turned on, the second switch, the third switch and the sixth switch are turned off, and the second terminal of the first capacitor unit is in the charging state, in a case that the inverter is in the third operation sub-mode; and the second switch, the fourth switch and the fifth switch are turned on, the first switch, the third switch and the sixth switch are turned off, and the second terminal of the first capacitor unit is in the discharging state, in a case that the inverter is in the fourth operation sub-mode; and
        the fourth switch and the fifth switch are turned on, and the first switch, the second switch, the third switch and the sixth switch are turned off, in a case that the inverter is in the sixth operation mode.

2. The inverter according to claim 1, wherein a current flows from the first terminal of the first switch to the second terminal of the first switch in a case that the first switch is turned on; a current flows from the first terminal of the third switch to the second terminal of the third switch in a case that the third switch is turned on; and a current flows from the first terminal of the fifth switch to the second terminal of the fifth switch in a case that the fifth switch is turned on; and
    a current flows from the second terminal of the second switch to the first terminal of the second switch in a case that the second switch is turned on; a current flows from the second terminal of the fourth switch to the first terminal of the fourth switch in a case that the fourth switch is turned on; and a current flows from the second terminal of the sixth switch to the first terminal of the sixth switch in a case that the sixth switch is turned on.

3. The inverter according to claim 2, wherein the inverter is configured to operate in three passive operation modes which comprises a seventh operation mode, a eighth operation mode and a ninth operation mode; wherein
the first switch, the second switch, the third switch and the sixth switch are turned on, and the fourth switch and the fifth switch are turned off, in a case that the inverter is in the seventh operation mode;
the third switch, the fourth switch, the fifth switch and the sixth switch are turned on, and the first switch and the second switch are turned off, in a case that the inverter is in the eighth operation mode; and
the first switch, the second switch, the fourth switch and the fifth switch are turned on, and the third switch and the sixth switch are turned off, in a case that the inverter is in the ninth operation mode.

4. The inverter according to claim 2, wherein the first reverse flow preventive element is a first diode, and the second reverse flow preventive element is a second diode; wherein
the first terminal of the first reverse flow preventive element is a cathode of the first diode, and the second terminal of the first reverse flow preventive element is an anode of the first diode; and
the first terminal of the second reverse flow preventive element is a cathode of the second diode, and the second terminal of the second reverse flow preventive element is an anode of the second diode.

5. The inverter according to claim 2, wherein the first reverse flow preventive element is the seventh switch, and the second reverse flow preventive element is the eighth switch; wherein
the seventh switch is turned off in a case that the first switch is turned on; and
the eighth switch is turned off in a case that the second switch is turned on.

6. The inverter according to claim 2, wherein the second terminal of the first inductor is further connected to a positive pole of an alternate-current grid via a third inductor, and the second terminal of the second inductor is further connected to a negative pole of the alternate-current grid via a fourth inductor.

7. The inverter according to claim 2, wherein the direct-current power supply is a photovoltaic power supply.

8. The inverter according to claim 1, wherein a period of a periodic signal outputted by the inverter comprises a first time interval, a second time interval, a third time interval, a fourth time interval, a fifth time interval and a sixth time interval; wherein
the inverter is configured to operate in the second operation mode and the third operation mode alternately during each of the first time interval and the third time interval;
the inverter is configured to operate in the first operation mode and the second operation mode alternately during the second time interval;
the inverter is configured to operate in the fifth operation mode and the sixth operation mode alternately during each of the fourth time interval and the sixth time interval; and
the inverter is configured to operate in the fourth operation mode and the fifth operation mode alternately during the fifth time interval.

9. The inverter according to claim 8, wherein the second terminal of the first capacitor unit is in a same charge-discharge state during the first time interval, the second time interval and the third time interval; and is in a same charge-discharge state during the fourth time interval, the fifth time interval and the sixth time interval, wherein the charge-discharge state of the second terminal of the first capacitor unit during fourth time interval, the fifth time interval and the sixth time interval is opposite to the charge-discharge state of the second terminal of the first capacitor unit during the first time interval, the second time interval and the third time interval; or
the second terminal of the first capacitor unit is in a same charge-discharge state during the first time interval, a latter half of the second time interval, the fourth time interval and a latter half of the fifth time interval; and is in a same charge-discharge state during a first half of the second time interval, the third time interval, a first half of the fifth time interval and the sixth time interval, wherein the charge-discharge state of the second terminal of the first capacitor unit during the first half of the second time interval, the third time interval, the first half of the fifth time interval and the sixth time interval is opposite to the charge-discharge state of the second terminal of the first capacitor unit during the first time interval, the latter half of the second time interval, the fourth time interval and the latter half of the fifth time interval; or
the second terminal of the first capacitor unit is in a same charge-discharge state during the first time interval, a latter half of the second time interval, a first half of the fifth time interval and the sixth time interval; and is in a same charge-discharge state during a first half of the second time interval, the third time interval, the fourth time interval and a latter half of the fifth time interval, wherein the charge-discharge state of the second terminal of the first capacitor unit during the first half of the second time interval, the third time interval, the fourth time interval and the latter half of the fifth time interval is opposite to the charge-discharge state of the second terminal of the first capacitor unit during the first time interval, the latter half of the second time interval, the first half of the fifth time interval and the sixth time interval.

10. The inverter according to claim 1, wherein the inverter is configured to operate in three passive operation modes which comprises a seventh operation mode, a eighth operation mode and a ninth operation mode; wherein
the first switch, the second switch, the third switch and the sixth switch are turned on, and the fourth switch and the fifth switch are turned off, in a case that the inverter is in the seventh operation mode;
the third switch, the fourth switch, the fifth switch and the sixth switch are turned on, and the first switch and the second switch are turned off, in a case that the inverter is in the eighth operation mode; and
the first switch, the second switch, the fourth switch and the fifth switch are turned on, and the third switch and the sixth switch are turned off, in a case that the inverter is in the ninth operation mode.

11. The inverter according to claim 1, wherein the first reverse flow preventive element is a first diode, and the second reverse flow preventive element is a second diode; wherein
the first terminal of the first reverse flow preventive element is a cathode of the first diode, and the second terminal of the first reverse flow preventive element is an anode of the first diode; and the first terminal of the second reverse flow preventive element is a cathode of the second diode, and the second terminal of the second reverse flow preventive element is an anode of the second diode.

12. The inverter according to claim 1, wherein the first reverse flow preventive element is the seventh switch, and the second reverse flow preventive element is the eighth switch; wherein the seventh switch is turned off in a case that the first switch is turned on; and the eighth switch is turned off in a case that the second switch is turned on.

13. The inverter according to claim 1, wherein the second terminal of the first inductor is further connected to a positive pole of an alternate-current grid via a third inductor, and the second terminal of the second inductor is further connected to a negative pole of the alternate-current grid via a fourth inductor.

14. The inverter according to claim 1, wherein the direct-current power supply is a photovoltaic power supply.

\* \* \* \* \*